United States Patent Office 2,821,521
Patented Jan. 28, 1958

2,821,521

POLYMERS OF N-(DIALKYLAMINOPROPYL) MALEAMIC ACID

John A. Price, Stamford, Conn., assignor to American Cyanamid Company, New York, N. Y., a corporation of Maine No Drawing. Application August 25, 1954
Serial No. 452,211

14 Claims. (Cl. 260—78)

This invention relates to polymerizable and polymerized compositions comprising at least one N-(dialkylaminopropyl)maleamic acid, and to methods of preparing the same. More particularly the invention relates to the use in the production of polymerization products, more particularly copolymers or interpolymers, of a compound represented by the general formula I
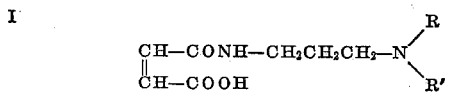

where R and R' each represents an alkyl radical containing from 1 to 6 carbon atoms, inclusive.

Illustrative examples of radicals represented by R and R' in the above formula, and which may be the same or different, are methyl, ethyl, propyl, isopropyl, n-butyl, isobutyl, sec.-butyl, tert.-butyl, n-amyl and the various isomeric amyl, and n-hexyl and the various isomeric hexyl radicals.

Illustrative examples of compounds embraced by Formula I are N-(3-dimethylaminopropyl)maleamic acid, the formula for which is II
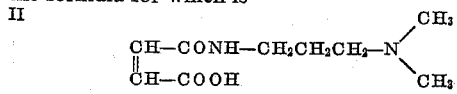

N-(3-di-n-hexylaminopropyl)maleamic acid and N-(3-N'-methyl-N'-ethylaminopropyl)maleamic acid. Other examples will be immediately apparent to those skilled in the art from Formula I and the examples of alkyl radicals represented by R and R' in the said formula.

The scope of the present invention includes polymerizable compositions comprising (1) a compound of the kind embraced by Formula I and (2) a compound which is different from the compound of (1), is copolymerizable therewith and which contains a $CH_2=C<$ grouping, as well as compositions or products comprising a copolymer of copolymerizable ingredients including as essential components the aforementioned compounds of (1) and (2).

It is an object of the present invention to provide a new class of polymerizable compositions containing an N-[3-di-(lower alkyl)aminopropyl]maleamic acid and one or more other comonomers copolymerizable therewith, and a new class of copolymer compositions from the said polymerizable compositions.

Another object of the invention is to provide a new class of synthetic compositions, more particularly resinous polymers and copolymers, which are especially suitable for use in the plastics, coating, adhesive, laminating, molding, fiber-forming and other arts.

Another object of the invention is the production of new acrylonitrile copolymer compositions which are more readily both fabricated (e. g., in fiber or other form) and dyed, especially with an acid dye, than homopolymeric acrylonitrile and many of the previously known or suggested copolymers of acrylonitrile in which a basic or other monomer has been incorporated as a part of the copolymer molecule.

Another object of the invention is to prepare such copolymers which can be spun or otherwise shaped to form filaments, tapes, ribbons, tubes, rods, sheets, etc., and the shaped articles then dyed either before or after having been oriented or treated to improve their useful properties.

Other objects of the invention will be apparent to those skilled in the art from the description and examples which follow.

The foregoing objects are attained by polymerizing chemical compounds embraced by Formula I; and, since such compounds are polymerizable alone only with considerable difficulty, preferably polymerizing the N-substituted maleamic acid while admixed with one or more (e. g., two, three, five, ten or any desired number) of other comonomers which are copolymerizable therewith, more particularly such comonomers which contain a $CH_2=C<$ grouping (that is, comonomers which contain either a single $CH_2=C<$ grouping or a plurality of such groupings, e. g., two, three, five or any higher number of such groupings), thereby to obtain copolymers which, in general, are resinous or potentially resinous materials and which are especially valuable for use in the plastics, coating, laminating, adhesive, molding, fiber-forming and other arts. Examples of comonomers with which the N-substituted maleamic acids embraced by Formula I can be copolymerized are vinyl compounds, more particularly vinyl aromatic compounds (e. g., styrene, dimethylstyrene and other vinyl aromatic hydrocarbons) and vinyl aliphatic compounds, for instance acrylonitrile, acrylamide, the alkyl esters of acrylic acid (e. g., methyl, ethyl, propyl, etc., acrylates), the various allyl esters, e. g., allyl acrylate, diallyl phthalate, diallyl succinate, etc.

The N-substituted maleamic acids used in practicing the present invention and which are embraced by Formula I are prepared by effecting reaction between maleic anhydride and an amine represented by the general formula

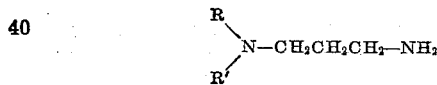

where R and R' each represents an alkyl radical containing from 1 to 6 carbon atoms, inclusive. The reactants are employed in a molar ratio of at least 1 mole (e .g., from 1 to 1.2 moles) of maleic anhydride per mole of the said amine, and the reaction is effected at a temperature not higher than about 30° C., preferably at from 1 or 2 to 10 or 15° C., and while the reactants are dissolved in an anhydrous solvent (e. g., benzene, toluene, xylene, etc.) in which they are inert. The product is then isolated from the resulting reaction mass, for instance by filtration and recrystallization from ethyl alcohol.

The copolymers of this invention, especially the acrylonitrile copolymers, have particular and peculiar properties that make them especially valuable for use in industry. In general, the N-substituted maleamic acid imparts basic characteristics to the copolymer so that it is more amenable to dyeing, especially with acid dyes, in fiber, sheet or other form. Furthermore, the carboxylic group is conducive to the obtainment of improved properties, e. g., higher stretchability without breaking, higher tensile strength values, and more wool-like properties, as well as other improvements, in fibers made from copolymers of acrylonitrile and the N-substituted maleamic acid, especially those obtained by polymerization of comonomers including acrylonitrile and the N-substituted maleamic acid in the ratio of, by weight, from about 70% to about 95% of the former to from about 5% to about 30% by weight of the latter.

Examples of monomers containing a $CH_2=C<$ grouping that can be copolymerized with an N-substituted maleamic acid of the kind embraced by Formula I, singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and aryl-acrylic, e. g., phenylacrylic, etc.), crotonic, oxalic, malonic, succinic, glutaric, adipic, pimelic, suberic, azelaic, sebacic, fumaric, citraconic, mesaconic, itaconic, acetylene, dicarboxylic aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various poly-substituted styrenes such, for example, as the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridines, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-(2-hydroxyethyl) acrylamides, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; unsaturated polyhydric alcohol (e. g., butenediol, etc.) esters of saturated and unsaturated, aliphatic and aromatic, monobasic and polybasic acids, illustrative examples of which appear above.

Other examples of monomers that can be copolymerized with a compound of the kind embraced by Formula I are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatibility and copolymerization characteristics of the mixed monomers.

Other and more specific examples of monomeric materials which can be mixed or blended with the N-substituted maleamic acid used in practicing my invention and the resulting homogeneous or substantially homogeneous, polymerizable composition then polymerized, as hereinafter more fully described, to yield new and valuable copolymer compositions are the allyl compounds and especially those which have a boiling point of at least about 60° C. Of the monomeric materials which may be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with a compound of the kind embraced by Formula I are allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, dialyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetrallyl silane, tetrallyl silicate, hexallyl disiloxane, etc.

Among the comonomers which are preferred for use in carrying our invention into effect are the vinyl compounds, including the vinyl and isopropenyl aromatic compounds, more particularly the vinyl and isopropenyl aromatic compounds, more particularly the vinyl and isopropenyl aromatic hydrocarbons (e. g., styrene, isopropenyl toluene, the various dialkyl styrenes, etc.), and the vinyl aliphatic compounds, e. g., acrylonitrile, acrylamide, etc., and other compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the ester grouping, examples of which are given above, as well as other vinyl aromatic and vinyl aliphatic compounds, and other compounds containing a $CH_2=C<$ grouping.

Any suitable means may be used in effecting polymerization of the N-substituted maleamic acid admixed with one or more monomers which are copolymerizable therewith. Heat or light or both, with or without a polymerization catalyst, can be used. Ultraviolet light is more effective than ordinary light. Preferably a polymerization catalyst is employed.

Any of the polymerization catalysts which are suitable for use in polymerizing compounds containing an ethylenically unsaturated grouping, specifically a vinyl grouping, can be employed. Among such catalysts are the various organic peroxy catalysts, illustrative examples of which latter are: the dialkyl peroxides, e. g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-compounds, examples of which are given hereinafter. Other so-called "free radical" types of catalysts, e. g., α,α'-azodiisobutyronitrile, also can be used to accelerate polymerization. The various known "redox" (reduction-oxidation) catalyst systems also can be employed, and are especially adapted for use when the mixed monomers are copolymerized in an aqueous medium. Such water-soluble catalyst systems generally comprise a water-soluble catalyst or catalysts and a water-soluble activator. Illustrative examples of water-soluble catalysts are water-soluble, oxygen-yielding peroxy compounds, e. g., the water-soluble peroxides, peracids and persalts, including hydrogen peroxide, organic peroxides, e. g., diacetyl peroxide, urea peroxide, etc., peracetic acid, the various water-soluble perchlorates, persulfates, percarbonates, perborates, perphosphates, etc., e. g., the ammonium and alkali-metal (sodium, potassium, lithium, etc.) salts of percarbonic, peracetic, perboric, perphosphoric, persulfuric, perchloric, etc., acids; and water-soluble ferric salts capable of yielding ferric ions, including the various ferric alums, e. g., ferric ammonium sulfate (ferric ammonium alum), ferric sodium sulfate, ferric potassium sulfate, etc. Other examples of water-soluble additives comprising a water-soluble catalyst that may be used in producing the copolymers of the present invention are given in, for instance, U. S. Patents 2,289,540, 2,380,474–7, 2,380,617–18, 2,380,710, 2,383,425, 2,384,544, 2,384,571, 2,384,574, 2,388,373 and 2,395,017.

Illustrative examples of water-soluble activators (water-soluble polymerization adjuvants) of the catalyst are oxygen-containing sulfur compounds which are capable of undergoing oxidation, for instance sulfur dioxide, the alkali-metal (e. g., sodium, potassium, etc.) bisulfites, hydrosulfites, thiosulfates, sulfurous acid (or compounds which engender sulfurous acid, e. g., alkali-metal sulfites, ethyl and other alkyl sulfites, etc.), various organic sulfinic acids, e. g., p-toluene sulfinic acid, formamidine sulfinic acid, etc. If alkali-metal sulfites, e. g., sodium sulfite, or similar compounds which engender sulfurous acid are used, the aqueous solution also should contain a strong acid, e. g., sulfuric acid, etc., in an amount which is at least chemically equivalent to the amount of such a compound engendering sulfurous acid that is employed.

If desired, the mixture of monomers can be polymerized in emulsion or in solution state to yield a copolymer. Good results are obtained by effecting copolymerization while the monomers are dissolved in a suitable solvent, preferably water or a liquid solvent comprising mainly water. Suitable inert organic solvents also can be used if desired, e. g., benzene, toluene, xylene, etc. Preferably the copolymerization reaction is carried out in a liquid medium in which the monomeric mixture is soluble but the copolymer is insoluble, e. g., water.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e. g., from, by weight, about 1 part of catalyst per 1,000 parts of the monomeric mixture to about 4 or 5 parts of catalyst per 100 parts of the mixture of monomers. The amount of polymerization adjuvant or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e. g., 2 or 3 or more moles of activator per mole of catalyst, or correspondingly larger proportions on a chemical equivalent basis, but no particular advantages ordinarily accrue therefrom.

Forms of radiation other than ultraviolet or visible light may also be used to initiate polymerization. Examples of such types of radiation are high-energy particles (e. g., high-energy electrons), X-rays and gamma radiation. Cobalt–60 is a convenient source of gamma radiation. In all of these cases polymerization may be initiated either by direct effect of radiation on the monomers or indirectly (if a solvent or other substance is present) by the action of radicals resulting from irradiation of these substances.

The polymerization (copolymerization) reaction may be effected, if desired, while the aqueous medium is maintained under an atmosphere of an inert gas, for example nitrogen, helium, carbon dioxide, etc.; or, it may be (but preferably is not) carried out under an atmosphere of air.

The temperature at which the monomers are copolymerized can be varied over a wide range, up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst, if any, used, the rapidity of polymerization water and other influencing factors. The use of polymerization temperatures substantially above the boiling point of the mixture of monomers is not precluded, but generally is less desirable because the polmerization reaction then must either be carried out in a closed reaction vessel under pressure, or, for economical reasons, with a reflux condenser or other means provided for the recovery and reuse of the volatilized monomer or monomers if the reaction is carried out at the boiling temperature of the mass under atmospheric pressure.

The copolymers of this invention can be produced in various molecular weights as desired or as conditions may require. Thus, the fiber-forming copolymers, more particularly the fiber-forming acrylonitrile copolymers, ordinarily are within the range of about 15,000 to about 300,000 or higher as calculated from viscosity measurements using the Staudinger equation (reference: U. S. Patent No. 2,404,713). Homogeneous acrylonitrile copolymers having an average molecular weight of between about 60,000 and 90,000 and which contain at least 70%, advantageously from about 85% to about 95% of acrylonitrile (combined acrylonitrile) in the molecule, are especially suitable for use in making dyeable, oriented fibers by wet- or dry-spinning methods.

If the copolymerization reaction is carried out while the mixed monomers are dissolved or dispersed in a liquid medium, e. g., in solution in water, the resulting copolymer then is separated from the said medium by any suitable means, e. g., by filtration, centrifuging, solvent extraction, etc.

The proportions of the N-substituted maleamic acid and monomeric material which is copolymerized therewith may be varied as desired or as conditions may require, but ordinarily the proportions thereof in the polymerizable mixture will be within the range of, by weight, from about 5% to about 50% of the former to from about 95% to about 50% of the latter, more particularly from about 5 or 10% to about 30 or 40% of the former to from about 90 or 95% to about 60 or 70% of the latter.

In order that those skilled in the art may better understand how the present invention can be carried into effect, the following examples are given by way of illustration and not by way of limitation. All parts and percentages are by weight.

*Example 1.—Preparation of N-(3-dimethylaminopropyl)maleamic acid*

To a reaction vessel equipped with a stirrer and an addition funnel is added a solution of 25 parts of maleic anhydride dissolved in 600 parts of benzene. The vessel is cooled with an ice-salt bath, after which 23 parts of dimethylaminopropylamine dissolved in 160 parts of benzene is slowly added to the stirred solution at a temperature of from about 4° to 6° C. over a period of 1 hour. The product is collected on a Büchner funnel and recrystallized from ethyl alcohol. The melting point of the recrystallized product is 56°–59° C.

In a similar manner to that just described any of the other N-substituted maleamic acids embraced by Formula I can be prepared by reacting the corresponding dialyklaminopropylamine with maleic anhydride.

*Example 2*

This example illustrates the preparation of homopolymeric acrylonitrile, which is subsequently employed in comparative dye tests with acrylonitrile copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

*Example 3*

To a reaction vessel equipped as in Example 2 is added 71.25 parts of acrylonitrile, 3.75 parts of N-(3-dimethylaminopropyl)maleamic acid and 1,000 parts of distilled water. The pH of this solution is 5.5. A rapid stream of pre-purified nitrogen gas is passed over the surface of the solution for 20 minutes. The nitrogen flow is then reduced to about one bubble per second. To the vessel is then added 1.5 parts of α,α'-azodiisobutyronitrile (polymerization catalyst). The solution first becomes cloudy at the end of 5 minutes. The polymerization is continued for a total of 4 hours at 60–65° C. The product is collected on a Büchner funnel, washed with 1,000 parts of demineralized water and dried in an oven at 70° C. for 16 hours. The yield of dry, white copolymer of acrylonitrile and N-(3-dimethylaminopropyl)maleamic acid amounts to 52 parts.

*Example 4*

A reaction vessel, equipped with a stirrer, reflux condenser, thermometer and gas-inlet tube, is placed in a constant-temperature water bath which is maintained at 35° C. To the vessel is added a solution of 47.7 parts of acrylonitrile, 5.3 parts of N-(3-dimethylaminopropyl) maleamic acid, 900 parts of demineralized water and 0.0196 part of sulfuric acid. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of one minute and the polymerization is fairly exothermic for the first half hour. The polymerization is continued for a total of 5 hours at 35° C. The polymer is collected on a Büchner funnel, washed with about 2,000 parts of demineralized water and dried in an oven at 70° C. to constant weight. A good yield of dry, white copolymer of acrylonitrile and N-(3-dimethylaminopropyl)maleamic acid is obtained.

Instead of using 5.3 parts of N-(3-dimethylaminopropylmaleamic acid in the above formulation, one can use 5.3 parts of N-(3-dibutylaminopropyl)maleamic acid or any other N-substituted maleamic acid of the kind embraced by Formula I to obtain the corresponding acrylonitrile copolymer.

*Example 5*

This example illustrates the preparation of a ternary polymer of acrylonitrile, vinyl acetate and N-(3-dimethylaminopropyl)maleamic acid.

The copolymerization is effected continuously, using apparatus which includes a reaction vessel that is provided with an overflow tube located at the top of the reaction vessel. Agitation is effected primarily by circulating the contents of the reaction vessel continuously through a high-speed centrifugal pump. Additional agitation in the reaction vessel is effected by means of a motor-driven propeller. The temperature is regulated by means of a heat-exchanger located in the circulating system. The solutions of monomeric material and of catalyst, hereafter described, are fed into the reaction vessel using variable-speed pumps.

The reactor is charged with a previously prepared aqueous slurry (e. g., a 35% aqueous slurry) of an acrylonitrile polymerization product (polymer or copolymer), more particularly (and for purpose of illustration and not by way of limitation) a two-component copolymer of about 95% acrylonitrile and 5% methyl acrylate. The following solutions are then fed in at such a rate that the stated quantities are delivered each hour.

Feed 1: Parts
Sodium chlorate _____ 0.85
Sodium sulfite _____ 2.98
Demineralized water _____ 290.00

Feed 2: Parts
Vinyl acetate_____ 5.4
Acrylonitrile _____ 194.0

Feed 3: Parts
N - (3 - dimethylaminopropyl)maleamic acid _____ 16.2
Sulphuric acid_____ 1.5
Demineralized water_____ 1250.00

The temperature of the slurry is maintained at 40° C., and the copolymerization reaction is stopped at the end of 6½ hours. The slurry resulting from the last 1½ hours of operation is combined with the final slurry in the reaction vessel.

The ternary polymer is isolated from the slurry by centrifuging, washed in the centrifuge with 40,000 parts of demineralized water, and dried in an oven at 70° C. for about 16 hours. A dry, white, dimethylformamide-soluble ternary polymer is obtained.

Instead of charging an aqueous slurry containing about 35% of a previously prepared copolymer of about 95% acrylonitrile and 5% methyl acrylate to the reactor, one can use a slurry containing any other suitable concentration of the previously prepared acrylonitrile polymerization product (e. g., from 5 or 10% to 35 or 40% by weight of the slurry). One can use an aqueous slurry containing, for example, a previously prepared homopolymer of acrylonitrile, or of a copolymer (dipolymer, tripolymer, tetrapolymer, etc.) different from the aforementioned acrylonitrile-methyl acrylate copolymer, thereby to obtain a blend of the acrylonitrile polymerization product contained in the previously prepared slurry and of the copolymer with which this invention is concerned. When this practice is followed, the concentration of the initially prepared acrylonitrile polymerization product in the slurry decreases as the continuous polymerization proceeds and will approach zero concentration eventually. When one desires the final product to be composed solely of the copolymer of this invention, then one charges to the reactor an aqueous slurry containing a suitable concentration of a previously prepared copolymer of the invention. The polymerization reaction advantageously is carried out at a pH not higher than 6, e. g., from 2.5 to 5.9, and preferably from 3.5 or 4 to 5.9.

The foregoing polymerization technique has numerous advantages over the prior-art practices, including the advantages of providing higher overall yields of the copolymer; better control of the reaction; the more ready production of acrylonitrile copolymers having a specific, predetermined average molecular weight (this latter being particularly important when the copolymers are to be formed or fabricated into fibers); the obtainment of a more homogeneous polymeric product (that is, one which contains minimum amounts of polymer having a molecular weight outside the lower and higher limits of molecular weight wanted in the product); as well as others. This polymerization method for producing the copolymers of this invention is, to the best of our knowledge and belief, new and novel.

Example 6

Twenty (20) parts of the ternary polymer of Example 5 is slurried by rapid stirring at room temperature in 80 parts of dimethylformamide. While protected by a blanket of carbon dioxide the temperature of the mixture is raised to 80° C. with slow stirring until all of the copolymer has dissolved to form a clear, viscous solution.

After deaeration and filtration the warm solution is extruded downwardly through a spinneret having 40 holes, each 70 microns in diameter, into a spinning cell, the inner wall of which is maintained at a temperature of approximately 425° C. by means of a fluid heating medium which circulates around the outer wall of the cell. A current of preheated gas at 125° C. is introduced at the bottom of the cell and passes upwardly countercurrent to the filaments which pass downwardly from the spinneret. By this means the major proportion of the dimethylformamide is evaporated from the filaments by the time the filaments have reached the bottom of the cell.

From the bottom of the cell the group of filaments or thread is led through water to remove the last of the dimethylformamide solvent, after which it is continuously dried by passing it over a pair of heated drying rolls. The dry multifilament thread is then thermoplastically stretched by conducting it through a slot which is maintained at 400° C. and thence to stretch rolls. Stretch is applied to the thread by having the surface speed of the rolls on the delivery end of the heated slot about 8 times that of the surface speed of the rolls which feed the thread to the slot. The filaments are oriented along the fiber axis by this stretching operation.

The thermoplastically stretched thread is more lustrous than that of the unstretched thread. To remove residual strains or shrinkage, the thread is conducted through a second, heated slot at 400° C. and thence to a pair of rolls, the surface speed of which is adjusted to permit about 15% shrinkage of the thread in the slot. After this thermoplastic treatment the thread is collected on a ring-twister bobbin.

The finished thread is tested for its dyeability, in comparison with threads similarly prepared from homopolymeric acrylonitrile, as follows:

Swatches (10 parts) of each of the dry fibers are added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the swatches are removed, and washed with hot water until the water is free of dye. The swatch of homopolymeric acrylonitrile fibers fails to absorb any dye whereas the swatch of fibers of this example is dyed a deep blue.

Example 7

This example illustrates the preparation of a ternary polymer of acrylonitrile, acrylamide and N-(3-dimethylaminopropyl) maleamic acid.

The same apparatus and general procedure are employed as in Example 5. The reacter is charged with an aqueous slurry composed of 420 parts of homopolymeric acrylonitrile and 1,180 parts of demineralized water having dissolved therein 2.67 parts of sulfuric acid. The system is purged with nitrogen as in Example 5. The following solutions are then fed in at such a rate that the stated quantities are delivered each hour:

Feed 1:
| | Parts |
|---|---|
| Acrylonitrile | 151.2 |
| Acrylamide | 10.8 |
| Tert.-dodecyl mercaptan | 0.3 |

Feed 2:
| | Parts |
|---|---|
| Sodium chlorate | 0.85 |
| Sodium sulfite | 2.98 |
| Demineralized water | 290.00 |

Feed 3:
| | Parts |
|---|---|
| Sulfuric acid | 1.5 |
| N-(3-dimethylaminopropyl)maleamic acid | 32.4 |
| Demineralized water | 290.0 |

The temperature of the slurry is maintained at 45° C., and the copolymerization reaction is stopped at the end of 5 hours. The ternary polymer is isolated from the reactor slurry by collection on a Büchner funnel, washed with demineralized water, and dried in an oven at 70° C. for about 16 hours. A dry, white, dimethylformamide-soluble ternary polymer is obtained.

Example 8

Samples of the homopolymeric acrylonitrile of Example 2 and of the acrylonitrile copolymers of Examples 3-5 and 7 are subjected to the same dye test described under Example 6. The homopolymer of Example 2 fails to absorb any dye whereas the acrylonitrile copolymers of the other examples are dyed blue. The advantages of modifying an acrylonitrile polymerization product by replacing a part of the initial acrylonitrile with an N-substituted maleamic acid of the kind embraced by Formula I, thereby to obtain a copolymeric acrylonitrile substance of improved dyeability, is therefore quite apparent.

Example 9

| | Parts |
|---|---|
| N-(3-diethylaminopropyl)maleamic acid | 20.0 |
| Styrene | 180.0 |
| 25% solution of dioctyl sodium sulfosuccinate in water | 20.0 |
| Water | 580.0 |
| Ammonium persulfate | 0.1 | are charged to a 3-necked reaction vessel equipped with a stirrer and a reflux condenser. The mixture is stirred vigorously while heating on a steam bath for 80 minutes, at the end of which period refluxing has ceased. Steam is now passed through the emulsion for 15 minutes to remove residual monomers. A small amount of coagulated copolymer is filtered out of the stable emulsion of the copolymer of styrene and the aforementioned N-substituted maleamic acid.

The copolymer latex may be used as a coating composition or as a component of such compositions.

The copolymer may be precipitated, if desired, from the aqueous emulsion thereof by adding a coagulating agent such, for instance, as salts (e. g., salts of polyvalent metals such as aluminum sulfate, magnesium chloride, barium chloride, etc., salts of monovalent metals such as sodium chloride, sodium sulfate, etc.), acids, e. g., formic acid, phosphoric acid, hydrochloric acid, etc., sulfides, e. g., magnesium sulfide, etc. The coagulated copolymer is separated from the aqueous phase, water-washed, and freed from entrapped water, for example by working on rolls to press out the water, followed by drying at a suitable temperature (e. g., at room temperature) under atmospheric pressure (preferably in a stream of dry air) or at subatmospheric pressures to remove the last traces of water. The dried copolymer, alone or with a dye, pigment, filler, plasticizer, lubricant, catalyst or other modifying agent, may be molded under heat and pressure, e. g., at 140° C. to 170° C. and under a pressure of 2000 to 5000 pounds per square inch.

*Example 10*

| | Parts |
|---|---|
| N-(3-di-isopropylaminopropyl)maleamic acid | 50.0 |
| Acrylonitrile | 50.0 |
| 25% solution of dioctyl sodium sulfosuccinate | 12.0 |
| Water | 287.0 |
| 30% aqueous solution of hydrogen peroxide | 2.2 |

All of the above ingredients with the exception of one-half (1.1 parts) of the aqueous hydrogen peroxide solution are charged to a reaction vessel as described under Example 9. The mixture is stirred vigorously while heating under reflux on a steam bath for 1½ hours, after which the remainder (1.1 parts) of the aqueous hydrogen peroxide solution is added to the reaction mass. Heating is continued under reflux for an additional 1½ hours, after which steam is passed through the emulsion for 15 to 20 minutes to remove residual monomers.

The emulsion is filtered and then frozen in a path of acetone and Dry Ice (solid carbon dioxide). About 30 parts of concentrated hydrochloric acid is added to the emulsion, which is then filtered to isolate the copolymer. The filter cake of copolymer is washed with water and dried in a vacuum oven at 50° C. for 48 hours, yielding a dried, copolymer of acrylonitrile and N-(3-di-isopropylaminopropyl)maleamic acid. This copolymer, alone or admixed with a filler or other additive, is adapted to be molded under heat and pressure to yield molded articles of various shapes.

*Example 11*

| | Parts |
|---|---|
| Methyl acrylate | 45.0 |
| N-(3-dimethylaminopropyl)maleamic acid | 5.0 |
| 25% solution of dioctyl sodium sulfosuccinate in water | 10.0 |
| Water | 190.0 |
| 30% aqueous solution of hydrogen peroxide | 0.55 |

The same general procedure is followed as described under Example 9. Stirring and heating under reflux are continued for 4½ hours, after which the emulsion is steamed for 1 hour to remove unpolymerized monomers. The resulting product is a fairly stable emulsion of copolymer, which may be used, for example, as a coating composition or as a component of such compositions.

It will be understood, of course, by those skilled in the art that my invention is not limited to the specific ingredients named in the above illustrative examples nor to the particular proportions and methods of polymerization and copolymerization mentioned therein. Thus, instead of using the N-substituted maleamic acid and the other comonomer or comonomers in the particular proportions given in the various examples, they can be used in any other proportions, as desired or as conditions may require, for instance in the proportions mentioned by way of illustration in the portion of the specification prior to the examples.

A comonomer (or plurality of comonomers) which contains one or more $CH_2=C<$ groupings, which is different from the N-substituted maleamic acid and which is compatible and copolymerizable therewith, other than the particular comonomers given in the above illustrative examples, also can be used. For instance, the comonomer may be a cyanoalkyl ester of an acrylic acid, e. g., mono-, di- and tricyanomethyl esters of acrylic acid, methacrylic acid, etc., the mono-, di- and tri- ($\beta$-cyanoethyl) esters of acrylic acid, methacrylic, etc. Or, the comonomer can be any other organic compound which is copolymerizable with the N-substituted maleamic acid and which is represented by the general formula III 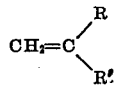

where R represents a member of the class consisting of hydrogen, halogen (chlorine, fluorine, bromine or iodine), alkyl (e. g., methyl, ethyl, propyl, butyl to octadecyl, inclusive), including cycloalkyl (e. g., cyclohexyl, etc.), aryl (e. g., phenyl, xenyl, naphthyl, etc.), alkaryl (e. g., tolyl, xylyl, ethylphenyl, etc.), aralkyl (e. g., benzyl, phenylethyl, etc.) and R' represents an aryl radical or a radical represented by the formula (a) 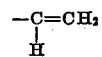

(b) 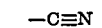

(c) 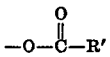

(d) 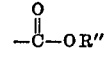

(e) 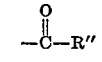

where R" represents an alkyl, alkoxyalkyl (e. g., methoxymethyl, methoxyethyl, ethoxyethyl, ethoxypropyl, propoxybutyl, etc.) or a carbocyclic radical (e. g., aryl, alkaryl, hydroaromatic, etc.). Examples of compounds embraced by Formula III are the vinyl esters (e. g., vinyl acetate, etc.), methyl vinyl ketone, isoprene, 1,3-butadiene, 2-chloro-1,3-butadiene, acrylonitrile, various esters of acrylic acid (e. g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art.

The proportions of any modifying comonomer or comonomers that are incorporated in the polymerizable compositions together with the N-substituted maleamic acid of the kind embraced by Formula I and acrylonitrile or other comonomer can be varied considerably. Ordinarily, however, especially in the case of acrylonitrile copolymer compositions, the acrylonitrile constitutes a major or preponderant proportion (more than 50%) by weight of monomers to be copolymerized, the N-substituted maleamic acid constitutes from about 5% to about 40%, more particularly from about 5% to about 30%, of the total weight of the acrylonitrile and the N-substituted maleamic acid, and any modifying comonomer or comonomers (if present in the polymerizable mixture) constitute the remainder of the total amount of comonomers which are subjected to copolymerization. In the preferred, fiber-forming, acrylonitrile copolymer compositions (more particularly thermoplastic acrylonitrile copolymer compositions) of the present invention, the acrylonitrile is employed in the mixture of comonomers in an amount such that at least 80% by weight of combined acrylonitrile is present in the copolymer.

Although many of the new copolymers, more particularly the acrylonitrile copolymers, of this invention are particularly useful in the formation of fibers or filaments having improved properties over that provided by homopolymeric acrylonitrile, both they and other copolymers of the present invention also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions can be used in the production of castings of any desired shape or size; as adhesives; in the treatment of paper or paper stock, or textile materials; in coating compositions; and for various other purposes. The copolymer can be formed in situ after application of the monomeric mixture to the base material to be coated, impregnated or otherwise treated. The water-soluble and/or organic solvent-soluble copolymers of this invention also can be used in similar applications, as well as in others, for instance: as modifiers, more particularly plasticizers, of aminoplast, phenoplast and other synthetic resins; as components of soil-conditioning, soil-stabilization and grouting compositions; and for many other purposes that will be apparent to those skilled in the art from the foregoing description.

Fibers can be produced from the acrylonitrile copolymers of the present invention in the manner described in, for example, Cresswell Patents 2,558,730 and 2,558,731 and Cresswell and Wizon Patent 2,558,733. Products (including textile materials) comprising an oriented fiber comprised of an acrylonitrile copolymer of this invention can be made into various forms such as blankets, carpets, knit garments, spun fabrics such as worsteds or, in general, any fabric in which a wool-like character is desirable.

I claim:

1. A polymerizable composition comprising (1) a compound represented by the general formula

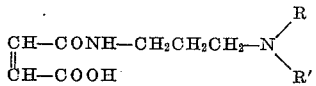

where R and R' each represents an alkyl radical containing from 1 to 6 carbon atoms, inclusive, and (2) a compound which is different from the compound of (1), which is copolymerizable therewith and contains a CH$_2$=C< grouping.

2. A product comprising a copolymer of copolymerizable ingredients including (1) a compound represented by the general formula

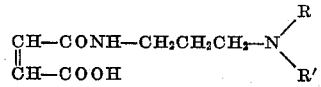

where R and R' each represents an alkyl radical containing from 1 to 6 carbon atoms, inclusive, and (2) a compound which is different from the compound of (1), which is copolymerizable therewith and contains a CH$_2$=C< grouping.

3. A product as in claim 2 wherein the compound of (1) is N-(3-dimethylaminopropyl)maleamic acid.

4. A product as in claim 2 wherein the compound of (2) is a vinyl compound.

5. A product as in claim 4 wherein the vinyl compound is a vinyl aromatic compound.

6. A product as in claim 5 wherein the vinyl aromatic compound is a vinyl aromatic hydrocarbon.

7. A product as in claim 6 wherein the vinyl aromatic hydrocarbon is styrene.

8. A product as in claim 4 wherein the vinyl compound is a vinyl aliphatic compound.

9. A product as in claim 8 wherein the vinyl aliphatic compound is acrylonitrile.

10. A product as in claim 8 wherein the vinyl aliphatic compound is an alkyl ester of acrylic acid.

11. A product comprising a copolymer obtained by polymerization of a mixture of copolymerizable ingredients including (1) a compound represented by the general formula

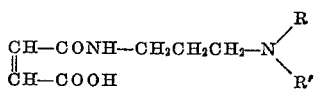

where R and R' each represents an alkyl radical containing from 1 to 6 carbon atoms, inclusive, and (2) acrylonitrile, the compound of (1) constituting from about 5% to about 40% by weight of the total amount of (1) and (2).

12. A product as in claim 11 wherein the copolymer is in the form of an oriented fiber and the compound of (1) constitutes from about 5% to about 30% by weight of the total amount of (1) and (2).

13. A textile material comprising an oriented fiber comprised of a copolymer obtained by polymerization of a mixture of copolymerizable ingredients including (1) N-(3-dimethylaminopropyl)maleamic acid and (2) acrylonitrile, the compound of (1) constituting from about 5% to about 30% by weight of the total amount of (1) and (2).

14. The method of preparing a new synthetic composition which comprises polymerizing, with the aid of a polymerization catalyst, a polymerizable composition comprising (1) a compound represented by the general formula

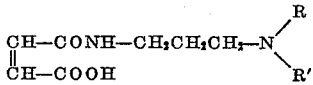

where R and R' each represents an alkyl radical containing from 1 to 6 carbon atoms, inclusive, and (2) a compound which is different from the compound of (1), is copolymerizable therewith and which contains a CH$_2$=C< grouping.

References Cited in the file of this patent

UNITED STATES PATENTS

| | | |
|---|---|---|
| 2,301,969 | Pinkernelle | Nov. 17, 1942 |
| 2,313,565 | McDowell et al. | Mar. 9, 1943 |
| 2,451,370 | Alderson | Oct. 12, 1948 |
| 2,459,964 | Robinson et al. | Jan. 25, 1949 |
| 2,522,680 | Kropa et al. | Sept. 19, 1950 |
| 2,533,204 | Caldwell | Dec. 12, 1950 |
| 2,686,774 | D'Alelio | Aug. 17, 1954 |

U. S. DEPARTMINT OF COMMERCE
PATENT OFFICE

CERTIFICATE OF CORRECTION

Patent No. 2,821,521 January 28, 1958

John A Price

It is hereby certified that error appears in the printed specification of the above numbered patent requiring correction and that the said Letters Patent should read as corrected below.

Column 3, line 19, after "acetylene" strike out the comma and insert a comma after "dicarboxylic", last word, same line; line 61, a hyphen should appear after "ma"; column 4, line 8, for "dialyl" read -- diallyl --; column 6, line 25, for "water" read -- wanted --; line 29, for "polmerization" read -- polymerization --; line 30, for "eilther" read -- either --; column 7, line 12, for "alyklaminoropylamine" read -- alkylaminopropylamine --; column 8, line 8, for "pylmaleamic read -- pyl)maleamic --; column 10, line 11, for "reacter" read -- reactor --; column 11, line 34, for "path" read -- bath --.

Signed and sealed this 1st dy of April 1958.

(SEAL)
Attest:
KARL H. AXLINE
Attesting Officer

ROBERT C. WATSON
Commissioner of Patents